Oct. 21, 1969 V. H. HASSELQUIST 3,473,272
ENCLOSURE INCLUDING FLACCID NON-METALLIC SURFACING
Filed April 10, 1967 4 Sheets-Sheet 4

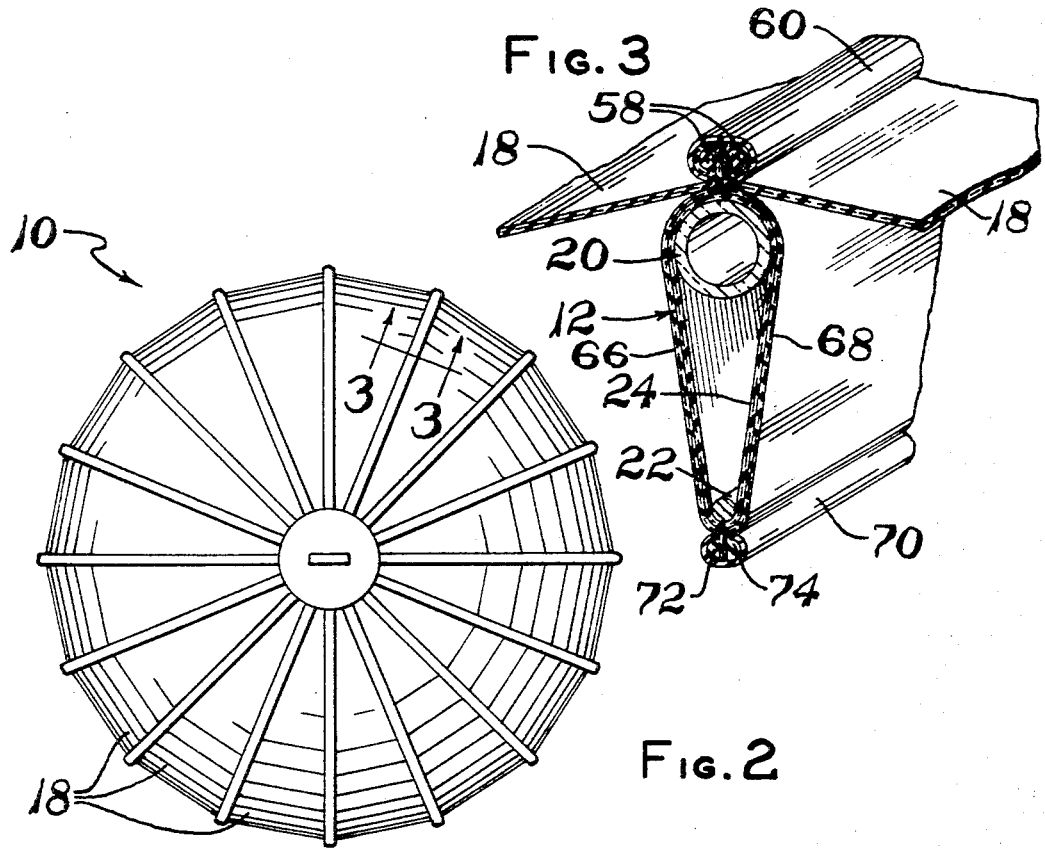
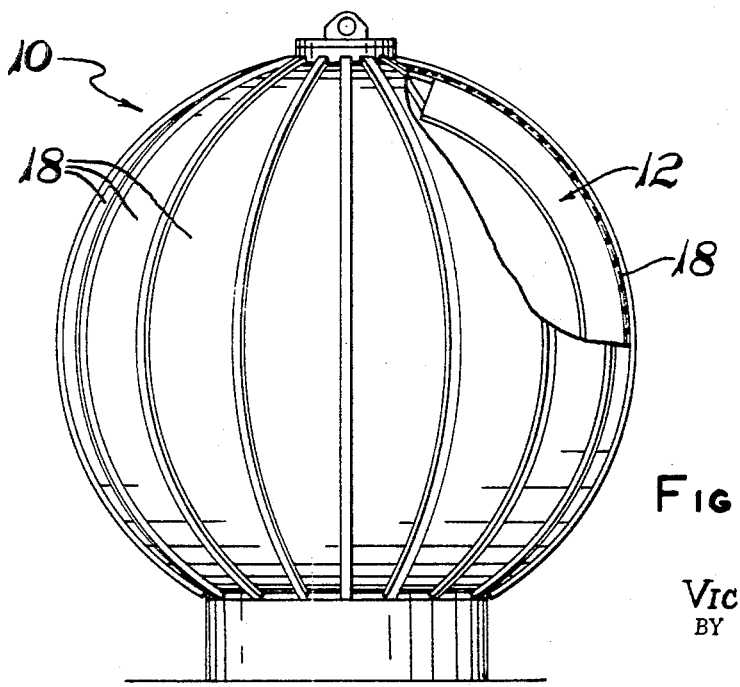

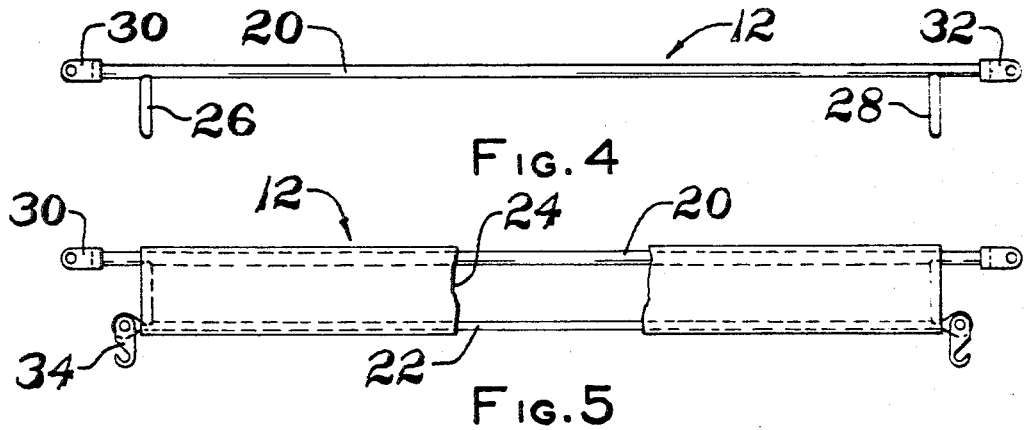
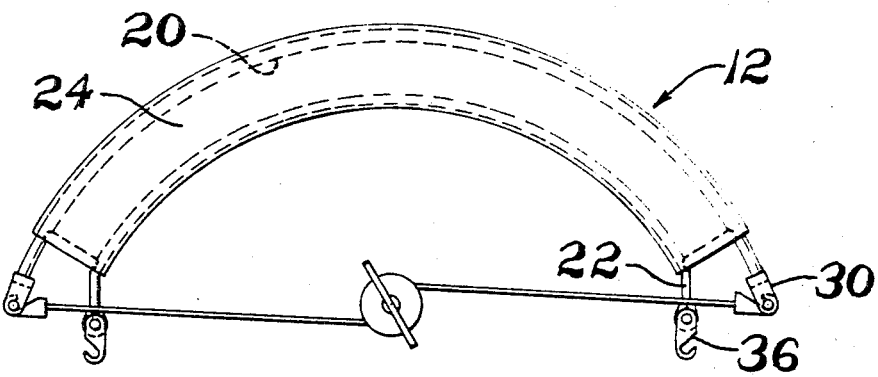
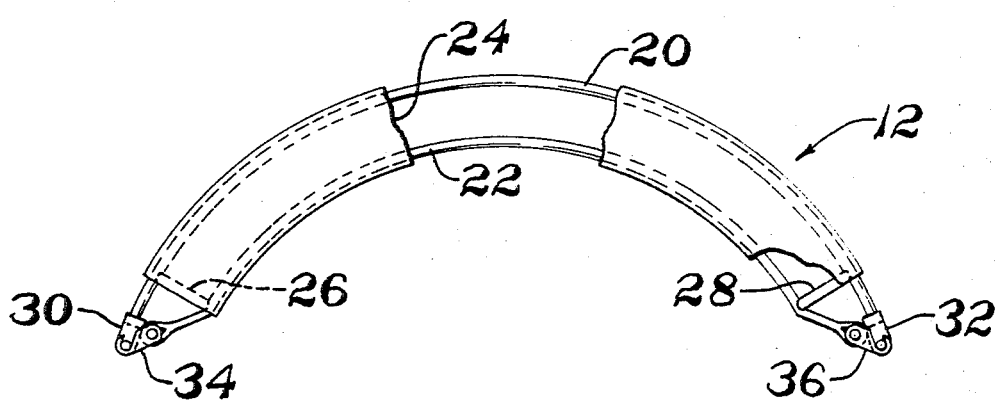

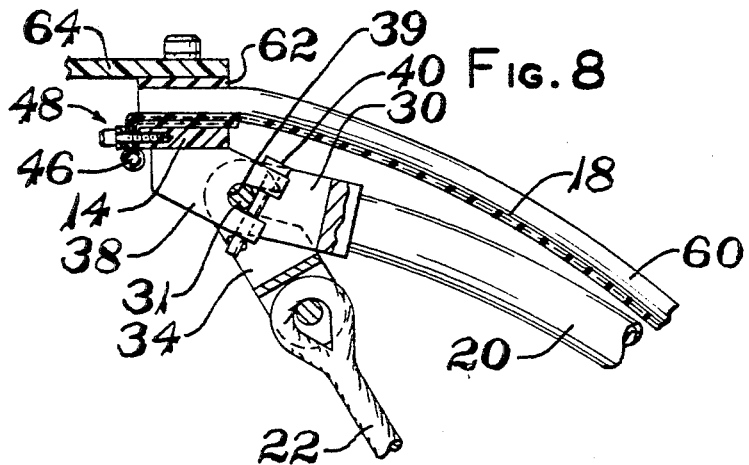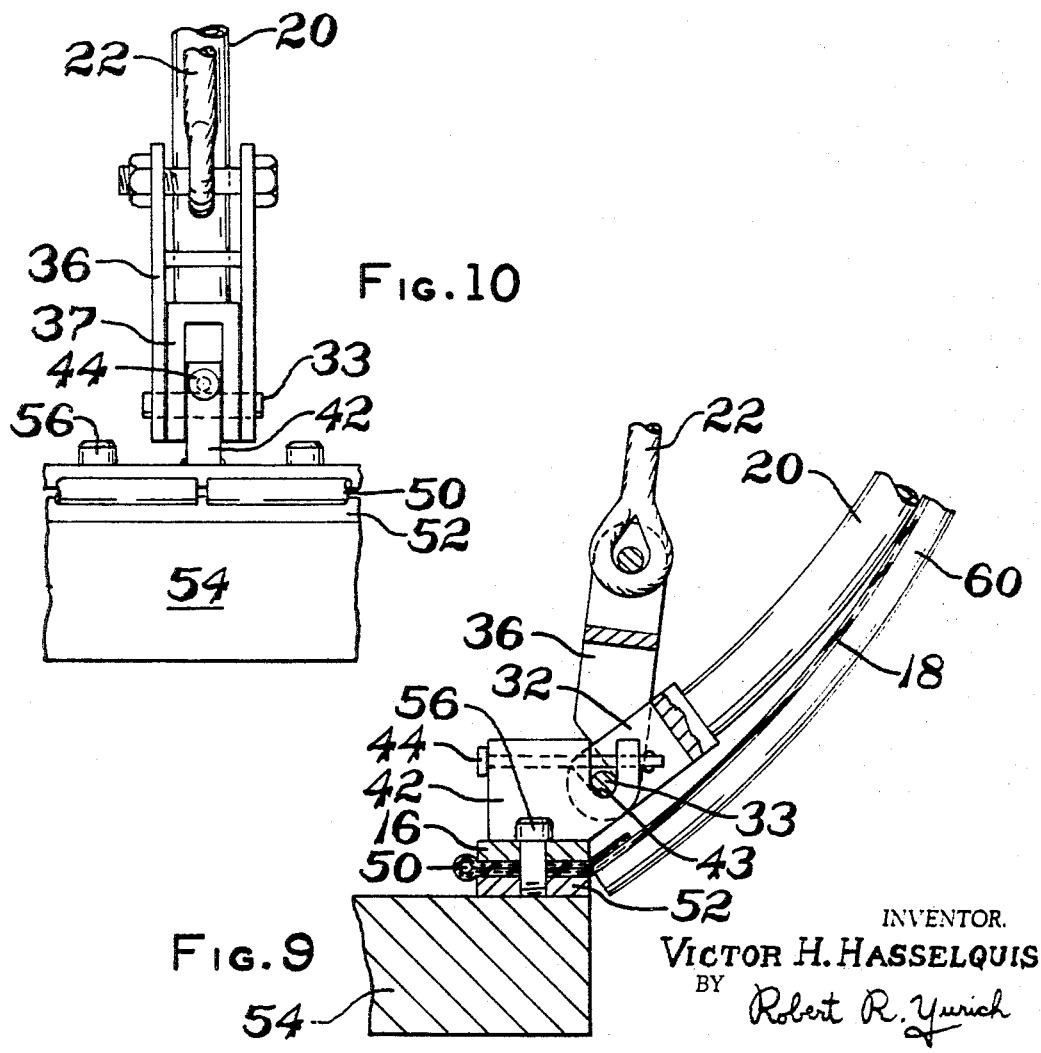

INVENTOR.
VICTOR H. HASSELQUIST
BY
Robert R. Yurich
ATTY.

United States Patent Office 3,473,272
Patented Oct. 21, 1969

3,473,272
ENCLOSURE INCLUDING FLACCID NON-
METALLIC SURFACING
Victor H. Hasselquist, Akron, Ohio, assignor to The
B. F. Goodrich Company, New York, N.Y., a corporation of New York
Filed Apr. 10, 1967, Ser. No. 629,730
Int. Cl. E04b 1/347; E04h 7/00; E04c 3/10
U.S. Cl. 52—63                                      11 Claims

ABSTRACT OF THE DISCLOSURE

A semi-permanent enclosure having a generally sphere-like framework formed by a plurality of lightweight structural rib elements and two opposing annular rings connecting the opposite ends of each of these lightweight structural ribs. This framework is enclosed by a series of segmented covers that are patterned to extend between the adjacent rib elements. This structure features a lightweight-high strength rib element that is formed by a prestressed flexible pole member which is held in such a prestressed or bowed condition by a tethering rope and a flexible sleeve.

Background of the invention

This invention relates to semi-permanent structures, and more particularly to an improved high-strength, lightweight structure that is especially suitable for use as a radome for housing large radar or communication installations.

The delicate instruments and antennas making up any complex radar or communication systems require adequate protection from wind and other weather conditions. The need for this protection is even greater when this type of equipment is used in remote areas such as in the Arctic regions of North America.

The problem of transporting personnel and materials to remote Arctic radar sites makes it impractical to provide conventional housing for radar and communication. In addition, the adverse weather conditions at the installation sites prevent the use of conventional building techniques. Therefore, a need exists for a non-conventional form of structure that can be easily transported to the radar site and then installed with a minimum of manpower and machinery.

In addition to enclosing the ground equipment and personnel, it is desirable to provide a housing that would also enclose the radar antennas. To enclose such tall sweeping antennas used in connection with radar and communication systems it is necessary that the housing structure have an extremely high ceiling and a large cross-sectional area that would permit 360° rotation of the antenna elements. The most efficient form of structure for providing these dimensional requirements would be one having a tall hemispherical shape. Conventional concrete or cement block buildings do not readily lend themselves to construction of such a hemispherical shape structure.

When the antenna elements of a radar system are entirely enclosed by a radome structure, it is necessary for the high frequency waves to be transmitted and received through the radome structure. Therefore, it is important that the enclosing structure be formed from relatively thin non-metallic materials in order to permit the most efficient transmission and reception of high frequency waves by the radar or communication equipment. Steel frame or skin structures that would be suited for providing a hemispherical structure are not suited for this type of service.

Summary of the invention

The improved semi-permanent structure of this invention features an extremely lightweight high-strength rib element that has an arcuate configuration that is ideally suited for use in the forming of the framework for a hemispherical-shaped enclosure that would adequately house a radar or communication system including the rotating antenna components.

The arcuate rib elements of this invention are formed by simple lightweight components that may be readily assembled with a minimum of equipment. Therefore, it is possible to deliver these components to the radar site for subassembly of the individual rib elements. This minimizes the problem of delivering preformed frame elements to the installation site.

The nature of the structure of this invention permits the use of materials such as fiberglass or flexible fabric materials rather than the conventional building materials. These materials, in addition to providing weight advantages, do not appreciably reduce the efficiency of any enclosed radar or communication system.

According to this invention, the foregoing features are provided by a plurality of prestressed rib elements, each of which includes a flexible pole that is held in a prestressed condition by a tethering rope and a flexible sleeve surrounding the major intermediate portion of the pole and rope; and a pair of opposing annular rings attached at the opposite ends of each of these rib elements to form a hemispherical framework; and a plurality of segmented cover strips extending between each pair of adjacent rib elements thereby forming a generally hemispherical-shape enclosure.

Brief description of the drawings

The following description and drawings illustrate a radome structure made according to and incorporating the preferred embodiments of this invention.

In the drawings:

FIG. 1 is an elevational view of the fully assembled radome.

FIG. 2 is a plan view of the assembled radome.

FIG. 3 is an isometric view of the radome at lines 3—3.

FIGS. 4–7 illustrate the preferred form of assembly and construction of one of the prestressed rib elements of the radome.

FIG. 8 shows the preferred manner of connecting the rib elements to an annular top ring.

FIGS. 9 and 10 illustrate the preferred manner of fastening the arcuate rib elements to the base of the radome.

Description of the preferred embodiment

Figure 11:
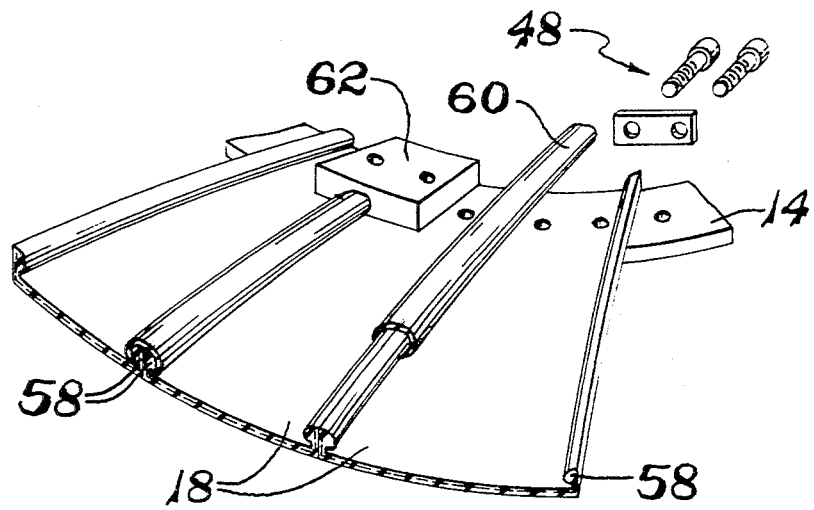
FIGS. 11 and 12 illustrate the preferred manner of assembling the segmented cover strips that extend between adjacent rib elements to enclose the rib element framework.

The structure of radome 10, illustrated in FIGS. 1 and 2, generally includes a framework formed by a plurality of rib elements 12, 12, joined at their opposite ends to two parallel annular rings 14 and 16 as typically shown in FIGS. 8 through 10. This frame or skeleton, consisting of rib elements 12, 12 and rings 14 and 16, is enclosed by segmental cover strips 18, 18 that are patterned to span the space between adjacent rib elements 12, 12 as shown in FIGS. 1 and 2.

Referring to FIG 7, each of these rib elements 12 include a prestressed flexible pole member 20 that is held in an arcuate or prestressed condition by means of a tethering rope 22 connected at the opposite ends of member 20. The rope 22 is substantially inextensible. Preferably, this flexible member 20 is a fiberglass pole that provides a flexible member with substantial strength. The intermediate portion of tethering rope 22 is spaced from pole member 20 by means of two stand-off members or spacer members 26 and 28 located near the outer ends of pole member 20. A restraining sleeve 24 extends between these stand-off members 26 and 28 enclosing the pole member 20 and the tethering rope 22. This restraining sleeve 24 restrains tethering rope 22 in tension so that tethering rope 22 assumes a generally arcuate configuration that is substantially parallel to the curvature of the prestressed pole member 20 as shown in the fully assembled rib element 12 of FIG. 7. This restraining sleeve 24 is preferably fabricated from a rubber coated fabric reinforced material.

In this preferred embodiment, the ends of tethering rope 22 and flexible pole 20 are joined by suitable fittings as shown in FIGS. 8–10. The fittings at the opposite ends of pole member 20 are integral clevis type fittings 30 and 32. These clevis type fittings 30 and 32 include transverse connecting pins 31 and 33, respectively, protruding beyond the sides of fittings 30 and 32. The opposite ends of tethering rope 22 have two attachment fittings 34 and 36 each of which includes a pair of arm projections that are spaced to fit immediately outside the respective clevis fittings 30 and 32 of pole member 20. Each of these arm portions includes a suitable slot for attaching the rope fittings 34 and 36 over the projecting connecting pins 31 and 33 of clevis fittings 30 and 32 in the manner shown in FIGS. 8 and 9.

These rib elements 12, 12 may be preassembled or they can be assembled at the installation site. In either event, FIGS. 4 through 7 illustrate the basic steps required for assembly of an individual rib element 12. In this assembly procedure, the restraining sleeve 24 along with the unconnected tethering rope 22 is drawn over the flexible pole 20 and standoffs 26 and 28 to the relaxed position shown in FIG. 5.

In FIG. 6, the flexible pole 20 is arched to a point immediately beyond its final arched or prestressed condition by a mechanical or power winch which is not a part of this invention. In this over-stressed condition, the attachment fittings 34 and 36 of tethering rope 22 are connected to the respective fittings 34 and 36 on pole 20.

When the winch is released, the tethering rope 22 will maintain a substantial bending tension on the flexible pole member 20 and the restraining sleeve 24 will restrain tethering rope 22 so that the curvature of flexible pole 20 and the curvature of tethering rope 22 are generally identical as illustrated in FIG. 7 showing the fully assembled rib element 12.

In forming the framework for structure 10, a plurality of these complete rib elements 12, 12 are arranged in seriatim order between a top annular ring 14 and a bottom ring 16. The top ends of these rib elements 12, 12 are attached to the top annular ring 14 in the preferred manner typically illustrated in FIG. 8. Similarly, the opposite ends of these rib elements 12, 12 are connected to a bottom annular ring 16 in the manner shown in FIGS. 9 and 10.

Referring to FIG. 8, the underside of top ring 14 includes a seriatim plurality of connecting lugs 38, 38 to which one end of the rib element 12 may be readily attached or connected. In this preferred embodiment, these lugs 38, 38 extend radially outward forming a receiving slot 39 as shown in FIG. 8. The clevis type fitting 30 of pole member 20 is drawn over this lug 38 with the connecting pin 31 of fitting 30 sliding into the receiving slot 39 on lug 38. This coupling is completed by a fastener 40 that locks pin 31 into slot 39 as shown in FIG. 8.

Referring to FIGS. 9 and 10, the lower base ring 16 similarly includes a plurality of base connecting lugs 42, 42 each of which includes a vertical receiving slot 43. The lower end of rib element 12 is connected to this mating base lug 42 on the base ring 16. The connecting pin 33 of pole member fitting 32 slides into this vertical receiving slot 43 and a fastener 44 thereby locks this lower end of rib element 12 into its installed position as shown in FIG. 9.

The preferred method of assembling the framework of structure 10 is to first couple all of the rib elements 12, 12 to the top ring 14, while top ring 14 is still on the ground. In this position these rib elements 12 will extend horizontally from the top ring 14 along the ground. The next step is to lift the top ring 14 to its approximate installation height. As the top ring 14 is raised, the rib elements 12, 12 will pivot on their respective connecting pins 31 to a substantially vertical position. When the rib elements 12 are in this substantially vertical position, the lower ends of each of the rib elements 12, 12 are connected to the base lugs 42 on the lower ring 16. This connection is made by sliding the connecting pin 33 of pole fitting 32 into the respective vertical receiving slot 43 of lug 42. This connecting pin 33 is then locked into slot 43 by means of fastener 44. By assembling the framework of structure 10 in the foregoing manner, it is possible to construct the structure 10 without the use of any auxiliary scaffolding.

Referring to FIGS. 1 and 2, the framework of structure 10 is covered by a series of segmented cover strips 18, 18. These cover strips are preferably made from a rubber-coated fabric reinforced material. This type of material has the desired flexibility to conform to the contour of the framework and the strength required to withstand substantial load forces. Each of these cover strips 18, 18 include a top margin 46 that includes an overlap portion over a small bead end. The bottom margin 50 of cover strip 18 includes a similar overlapped bead section as shown in FIG. 9. The opposite longitudinal edge margins of each cover strip 18 include semi-circular bead strips 58, 58, as shown in FIG. 3.

In the assembly of these cover strips 18, 18 to the framework of structure 10, the top margin 46 of each of the cover strips 18, 18 is first fastened to the top ring 14 by means of a fastener means 48 in the manner typically shown in FIG. 8 and FIG. 11. The next step in assembling cover strips 18, 18 is for the bottom margin 50 of each of the cover strips 18 to be clamped under the base ring 16 between ring 16 and a second bottom ring 52 by a fastener 56 in the manner shown in FIG. 9. Finally, the longitudinal beaded margins 58, 58 of the adjacent cover strips 18, 18 are joined together by means of a longitudinally extending C-shape connector 60 in the manner shown in FIG. 11.

Figure 12:
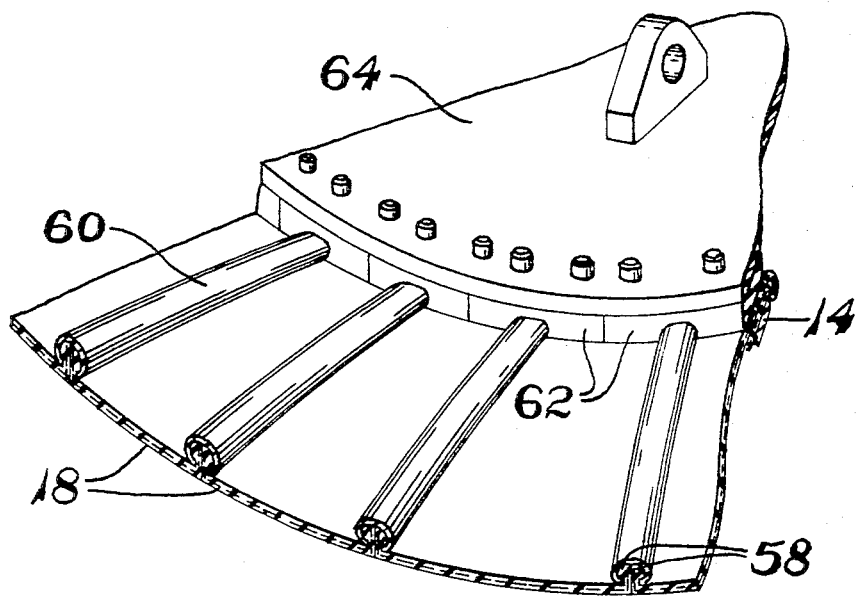

After the cover strips 18, 18 have been fully secured to the framework of structure 10 by connector 60, a plurality of rubber segmental spacers 62, 62 are positioned on the top end of the connectors 60, 60 directly over the top ring 14 as shown in FIG. 11. This entire top assembly is covered by a cap 64 that is joined to this assembly by peripheral fasteners as shown in FIG. 12.

In the actual assembly of the cover strips 18, 18 to the framework of structure 10, it is possible to attach the upper margins 46 of cover 18 to ring 14 while the ring 14 is on the ground. This attachment may be made at the same time that rib elements 12 are fastened to top ring 14. After the rib elements 12, 12 and cover strips 18, 18 have been fastened to top ring 14, top ring 14 is raised to its full height. In this position, the lower bottom margin 50 of cover strip 18 is clamped between the bottom ring 16 and the second ring 52 on a base platform 54 as shown in FIGS. 9 and 10. With these top margins 46, 46 and bottom margins 50, 50 of cover strip 18 fully secured, the longitudinal beaded edges 58 of adjacent cover strips 18, 18 are joined by sliding the C-shaped connector 60 over these adjacent bead edges 58, 58 in the manner shown in FIG. 11. When all the adjacent bead edges 58, 58 are joined, the rubber spacer segments 62 are placed over connectors 60 around the entire periphery of ring 14. Finally, the cap 64 is placed over the segmented spacers 62 and fastened in a manner shown in FIG. 12.

Referring to FIG. 3, one modification to the foregoing structure 10 is the addition of a pair of retaining webs 66 and 68. These retaining webs 66 and 68 may be provided to directly connect the rib elements 12, 12 to the cover strips 18, 18. This will prevent any shifting in the alignment of the cover strips 18 on the framework of structure 10. In this modification, the outermost edges of these retaining webs 66 and 68 are clamped by the connectors 60 along with the longitudinal bead edges 58, 58 of cover strips 18, 18. The opposite edges of these retaining webs 66 include longitudinal semi-circular beads 72 and 74. These retaining webs 66 and 68 straddle rib element 12. In this position the retaining webs 66 and 68 are joined at their respective bead edges 72 and 74 by another C-shape inner connector member 20.

Although the present invention has been presently illustrated and described in connection with two embodiments of the invention, it is further understood that modifications and adaptations may be made without departing from the spirit and scope of the invention as set forth in the appended claims.

I claim:

1. A structural rib element comprising an elongated narrow cross-sectional flexible pole member disposed in a substantial arc, an inextensibe flexible member having its respective ends connecting the opposite ends of said pole member imparting a substantial arcuate condition to said pole member, said inextensible member being disposed in a substantial arc identical to the arc of said pole member, and spacer means interconnecting said pole member and said inextensible member to maintain said pole member and said inextensible member in close arcuately adjacent parallel relationship.

2. A structural rib element as set forth in claim 1 wherein said pole member and said inextensible members are non-metallic members.

3. A structural rib element as set forth in claim 1 wherein said pole member is a fiberglass pole member.

4. A structural rib element as set forth in claim 3 wherein said spacer means includes a sleeve encompassing said pole member and said inextensible member to maintain said parallel relationship.

5. A structural rib element according to claim 1 wherein said spacer means includes a first standoff element attached near one end of said flexible pole member and a second standoff element near the opposite end of said flexible pole member.

6. A structural rib element according to claim 5 wherein said spacer means further includes a flexible sleeve restraining the intermediate portion of said pole and said inextensible members so that the portion of said inextensible member between said standoffs is substantially equidistant from said pole member.

7. A building structure comprising a plurality of circumferentially spaced arcuate rib elements, each of which includes a prestressed flexible pole member and means for continuously restraining said pole member in substantial arcuate configuration, each of said restraining means being disposed in a substantial arc identical to the arc of the adjacent associated said pole member, means for seriatimly joining the respective opposite ends of said plurality of rib elements to form a substantially spherical framework, and a plurality of flexible cover strips extending between the adjacent rib elements.

8. A building structure according to claim 7 wherein said means for joining the opposite ends of said plurality of rib elements includes a top annular ring for connecting the upper ends of said plurality of rib elements and a bottom annular ring having a diameter greater than the diameter of said top ring but substantially less than the diameter of said spherical framework.

9. A building structure according to claim 8 wherein each of said rib elements includes a means for pivotally connecting said rib elements to said top ring so that said ribs can be sub-assembled to its final installed height prior to raising said top ring.

10. A building structure according to claim 7 wherein said cover strips include opposing longitudinal bead margins and said structure further includes a plurality of C-shaped channel connectors each of which join the marginal bead edges of adjacent cover strips.

11. A building structure according to claim 10 wherein said cover strips further include a pair of retaining webs adapted for straddling said rib elements and means for connecting the unattached edges of said retaining webs thereby permanently positioning said cover strips relative to said rib elements.

References Cited

UNITED STATES PATENTS

| | | | |
|---|---|---|---|
| 453,470 | 6/1891 | Geiger et al. | 52—461 |
| 2,427,021 | 9/1947 | Rapp | 52—225 |
| 2,636,457 | 4/1953 | Finlay et al. | 52—644 |
| 2,670,818 | 3/1954 | Hacker | 52—80 |
| 2,923,305 | 2/1960 | Cline | 52—459 |
| 2,948,047 | 8/1960 | Peeler et al. | 52—471 |
| 3,165,110 | 1/1965 | Brooks | 52—222 |
| 3,240,217 | 3/1966 | Bird et al. | 52—86 |
| 2,151,234 | 3/1939 | Rutten et al. | 52—461 |
| 3,137,371 | 6/1964 | Nye | 52—461 |
| 3,380,203 | 4/1968 | Peterschmidt | 52—81 |

FOREIGN PATENTS 164,961   9/1965   Australia.

FRANK L. ABBOTT, Primary Examiner

JAMES L. RIDGILL, JR., Assistant Examiner

U.S. Cl. X.R.

52—80, 82, 222, 465